United States Patent
Keener

(10) Patent No.: US 6,422,364 B1
(45) Date of Patent: Jul. 23, 2002

(54) PRESS DRIVE WITH OIL SHEAR CLUTCH/BRAKE UNITS

(75) Inventor: Dave Keener, Port Huron, MI (US)

(73) Assignee: Midwest Brake Bond Company, Warren, MI (US)

( * ) Notice: Subject to any disclaimer, the term of this patent is extended or adjusted under 35 U.S.C. 154(b) by 0 days.

(21) Appl. No.: 09/710,148

(22) Filed: Nov. 10, 2000

(51) Int. Cl.[7] .............................................. F16D 67/02
(52) U.S. Cl. ...................... 192/18 A; 192/16; 192/12 C
(58) Field of Search ............................. 192/18 A, 18 R, 192/12 R, 12 C, 15, 16, 14; 188/71.5, 170

(56) References Cited

U.S. PATENT DOCUMENTS

| | | | |
|---|---|---|---|
| 3,182,776 A | 5/1965 | Sommer | |
| 3,614,999 A | 10/1971 | Sommer | |
| 3,696,898 A | 10/1972 | Sommer | |
| 3,713,517 A | 1/1973 | Sommer | |
| 3,946,840 A | 3/1976 | Sommer | |
| 3,971,461 A | * 7/1976 | Conroy et al. | ............. 192/18 A |
| 4,223,829 A | * 9/1980 | Bange | .......................... 133/24 |
| 4,693,350 A | 9/1987 | Sommer | |
| 5,190,129 A | 3/1993 | Sommer | |
| 5,195,623 A | 3/1993 | Sommer | |
| 5,487,456 A | 1/1996 | Sommer | |
| 5,657,843 A | 8/1997 | Sommer | |
| 5,769,187 A | 6/1998 | Sommer | |
| 5,806,641 A | 9/1998 | Sommer | |
| 5,921,361 A | 7/1999 | Sommer | |
| 5,947,244 A | 9/1999 | Sommer | |
| 5,988,326 A | 11/1999 | Sommer | |
| 6,029,786 A | 2/2000 | Sommer | |
| 6,095,298 A | * 8/2000 | Burns et al. | ............... 192/18 A |

* cited by examiner

*Primary Examiner*—Saul Rodriguez
(74) *Attorney, Agent, or Firm*—Harness, Dickey & Pierce, P.L.C.

(57) ABSTRACT

A drive unit for a press uses an oil shear brake and an oil shear clutch which are located axially along the output member of the drive unit. A multiple piece piston moves between a brake applied/clutch disengaged position to a brake released/clutch engaged position under the influence of a hydraulic pressure. Cooling and lubrication oil is provided to the drive unit through the output member and lubricating oil is received from the drive member through a stationary support member. An adjustment member is capable of adjusting the gap between the piston and the clutch and brake units in order to eliminate any overlap between these two units.

13 Claims, 2 Drawing Sheets

PRESS DRIVE WITH OIL SHEAR CLUTCH/BRAKE UNITS

FIELD OF THE INVENTION

The present invention relates to press drives. More particularly, the present invention relates to a single speed, hydraulic actuated press drive which utilizes an oil shear clutch unit, an oil shear brake unit and a hydraulically actuated actuator having a replaceable cylinder sleeve which simultaneously operates both the clutch unit and the brake unit.

BACKGROUND OF THE INVENTION

Press drives having dry friction clutch/brake units depend on the rubbing of a dry friction material against dry reaction members to start and stop the press. This dry friction rubbing causes wear of both the friction material and the reaction members as well as the generation of heat due to this rubbing. The faster the press operates and/or the faster the flywheel rotates, the greater the wear and heat generated. This generation of wear and heat requires periodic gap adjustments between the dry friction material and the dry reaction members to keep the press operating correctly.

Some dry friction clutch units and brake units in press drives are mechanically interlocked. Mechanical interlocking of the dry friction clutch and the brake units means that a single piston releases the brake and then engages the clutch when the press is started. For stopping the press, the clutch is first released and then the brake is applied by the piston. These mechanically interlocked units have a significant portion of the mass of the clutch and brake units mounted on the drive shaft and this can represent as much as 80% of the total inertia of the press that the press drive must start and stop. Mechanical interlocking of the dry friction clutch and brake units reduces the frequency required for gap adjustments because the two units are never simultaneously engaged, but mechanical interlocking does not eliminate the adjustment procedure. Adjustment for these dry friction units is still necessary when the gap has increased to the point that the response of the press is adversely affected.

Press drive builders have introduced lower inertia clutch and brake designs in an effort to reduce the start/stop inertia and thus increase the useful life of these drives. These low inertia drives typically require separate pistons to release the brake and to engage the clutch. The start-stop inertia with these drives has been reduced to approximately 60% of the total inertia. In order for the press drive to function correctly, the separate pistons must be properly synchronized to prevent overlap of the clutch and brake units. When the clutch starts to engage before the brake is fully released, or, when the brake starts engaging before the clutch is fully disengaged, excessive heat is generated and wear of the friction material and the reaction member is greatly increased. Conversely, if there is too much time between the engage/release of the clutch/brake, drifting occurs resulting in sluggish operation and if the drift is high enough, it can result in unsafe operation of the press.

In addition to the issues discussed above, the trip rate for a press equipped with a dry friction clutch/brake unit in the press drive is limited because the mass of the unit determines its heat capacity. If the mass is increased to increase its heat capacity, the inertia that must be stopped and started is also increased. The two factors define a closed loop from which it is impossible to escape when trying to increase the performance of the system.

The continued development of press drives includes the development of clutch and brake units which address the problems associated with dry friction clutch and brake units, the high inertia associated with the clutch and brake units and the synchronization for the operation of the clutch and brake units.

SUMMARY OF THE INVENTION

The present invention provides the art with a press drive system which utilizes oil shear brake and clutch units. The entire system uses hydraulic actuation instead of air actuation. The clutch and brake units are arranged axially along the output shaft to minimize the outer size of the unit and thus reduce the inertia of the system. The clutch and brake units are mechanically interlocked using a multiple piece piston that moves in response to the pressurized hydraulic fluid. The system includes a replaceable cylinder sleeve for the piston and an adjustment system for setting the gap and thus the time between release of the brake and engagement of the clutch.

The oil shear design for the clutch and brake units offer the advantages of little or no wear for the friction material and the reaction members. In addition, the oil shear design does not have the problem of brake fade. This provides a more precise operation of the press and dramatically increases press up-time. The oil from within these oil shear units carries the heat generated by start-stops away from the friction material and the reaction members. This removal of heat offers the advantages that there is now no practical limit for the press trip rate and flywheel speed plus it provides unlimited inching capabilities.

The clutch and brake units of the present invention utilize a disc stack of multiple discs. These multiple disc surfaces can be used to greatly reduce the clutch/brake inertia thereby allowing the mechanical interlocking of the clutch and brake units without inertia penalty. In addition, the axial positioning of these two units also helps in the reduction of the clutch/brake inertia.

Finally, the mechanical interlocking of the clutch and brake units eliminates the need for any gap adjustment since the friction material and the reaction members experience little or no wear. The present invention provides for a unique system for setting the initial gap and could be used during the extended life of the press drive to reset the gap if desired.

Other advantages and objects of the present invention will become apparent to hose skilled in the art from the subsequent detailed description, appended claims and drawings.

BRIEF DESCRIPTION OF THE DRAWINGS

In the drawings which illustrates the best mode presently contemplated for carrying out the present invention.

DETAILED DESCRIPTION OF THE PREFERRED EMBODIMENT

Figure 1:
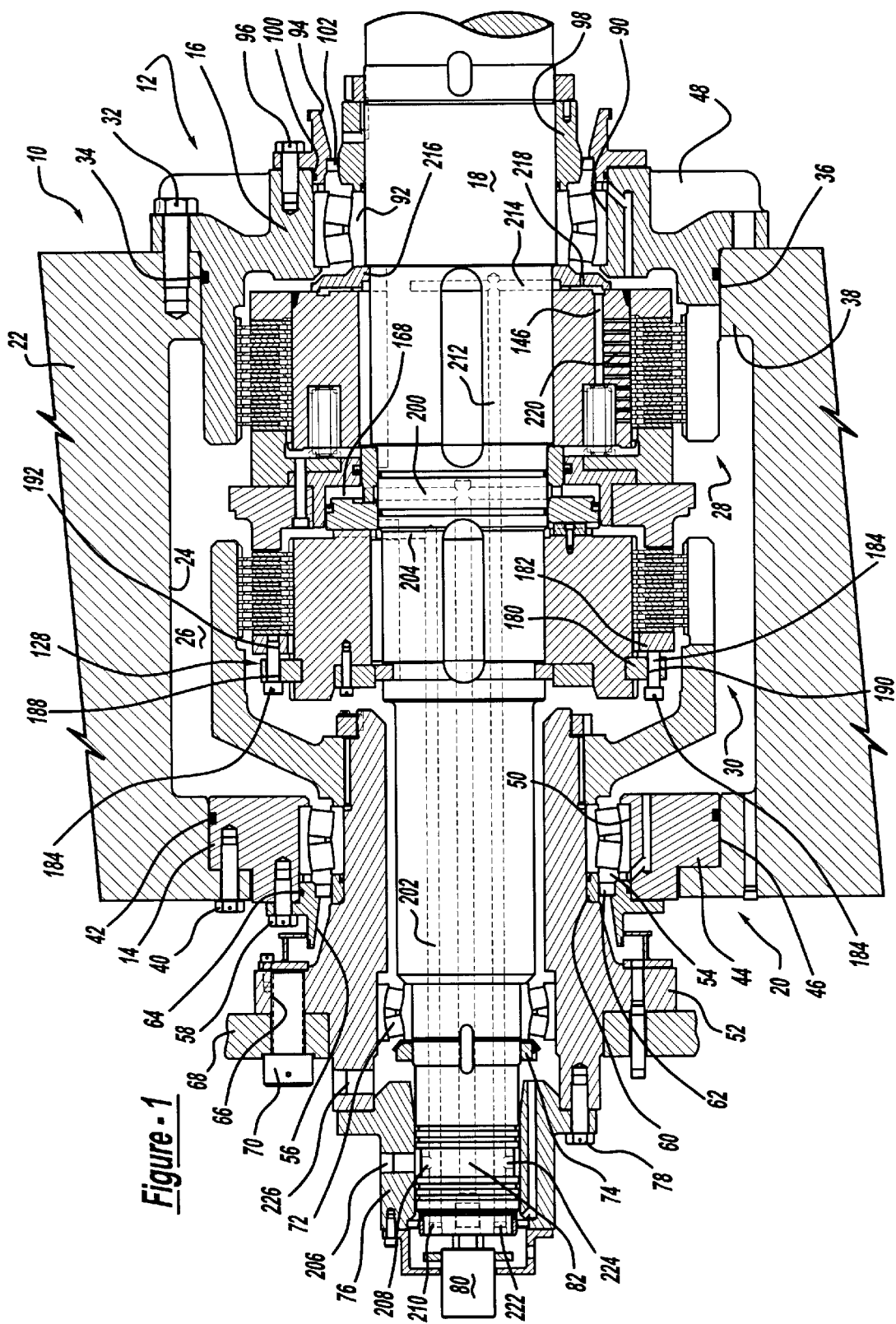
FIG. 1 is a side view, partially in cross-section, of a press drive unit in accordance with the present invention.
Figure 2:
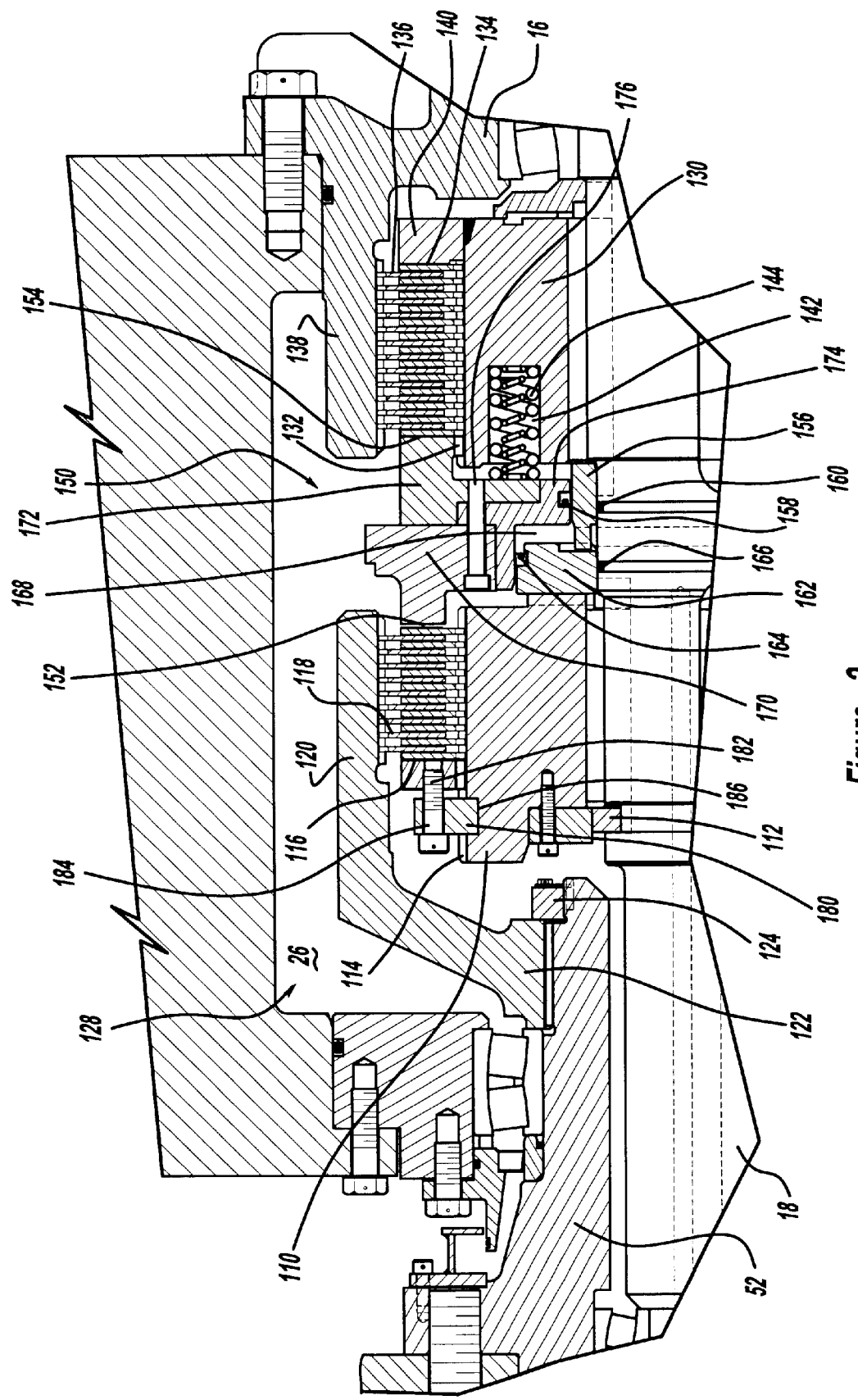
FIG. 2 is an enlarged cross-section of the brake and clutch units illustrated in FIG. 1.

Referring now to the drawings in which like reference numerals designate like or corresponding parts throughout the several views, there is shown in FIGS. 1 and 2 a press drive which includes a clutch and a brake unit in accordance with the present invention and which is designated generally by the reference numeral 10. Press drive 10 comprises a rotatable housing assembly 12 having a pair of end wall members 14 and 16 which are spaced axially or longitudinally along a rotational drive shaft 18. Housing assembly 12 forms an outer hub assembly 20 for operatively connecting a rotatable flywheel 22 to shaft 18. Flywheel 22 defines a central axial extending bore 24 spaced radially outwardly from drive shaft 18 to define one wall portion of an internal cavity 26 within which are located a clutch unit 28 and a brake unit 30. One axial end of cavity 26 is closed by end wall member 16 which is fixedly secured to flywheel 22 by a plurality of bolts 32 with a seal 34 being provided between a shoulder 36 formed on end wall member 16 and a mating shoulder 38 formed on flywheel 22. The end of cavity 26 opposite to end wall member 16 is adapted to be closed by end wall member 14. End wall member 14 is fixedly secured to flywheel 22 by a plurality of bolts 40 with a seal 42 being provided between a shoulder 44 formed on end wall member 14 and a mating shoulder 46 formed on flywheel 22. End wall member 16 is preferably provided with a plurality of circumferentially spaced ribs or fins 48 for purposes of heat dissipation.

End wall member 14 defines a central bore 50 within which is disposed an axially extending support member 52. A bearing 54 is disposed between end wall member 14 and support member 52. A first bearing retainer 56 is secured to end wall member 14 by a plurality of bolts 58 for retaining bearing 54. A second bearing retainer 60 is secured to support member 52. A seal 62 is disposed between first bearing retainer 56 and second bearing retainer 60. A seal 64 seals the interface between bearing retainer 56 and end wall member 14. Thus, flywheel 22 is rotatably supported with respect to support member 56 by bearing 54 and cavity 26 is sealed by seal 62. Support member 52 defines a plurality of bores 66 to suitably secure support member 52 to a non-rotatable structure 68 using a plurality of bolts 70. A second bearing 72 is disposed between support member 52 and drive shaft 18 to rotatably support drive shaft 18. Bearing 72 is retained on drive shaft 18 by a retainer 74 which is threadingly received on drive shaft 18. An oil supply housing 76 is secured to support member 52 by a plurality of bolts 78. A rotary union 80 is threadingly received within a bore 82 extending into drive shaft 18 for providing pressurized hydraulic fluid to clutch unit 28 and brake unit 30 as is detailed below.

End wall member 16 defines a central opening 90 through which drive shaft 18 extends. A bearing 92 is disposed between end wall member 16 and drive shaft 18. A first bearing retainer 94 is secured to end wall member 16 using a plurality of bolts 96 and a second bearing retainer 98 is secured to drive shaft 18 for retaining bearing 92. A seal 100 is disposed between end wall member 16 and retainer 94 and a seal 102 is disposed between retainers 94 and 98 to seal cavity 26.

Briefly, in operation, flywheel 22 rotates by receiving power from a plurality of V-belts or by other means known in the art. Rotation of flywheel 22 is selectively transmitted to drive shaft 18 through clutch unit 28. Normally, brake unit 30 prohibits rotation of drive shaft 18. When it is desired to power drive shaft 18 by flywheel 22, brake unit 30 is released and then clutch unit 28 is engaged. Subsequently, when it is desired to stop drive shaft 18, clutch unit 28 is disengaged and then brake unit 30 is applied.

Mounted on drive shaft 18 for rotation with drive shaft 18 within cavity 26 is an annular brake hub 110. A retaining ring 112 located within a groove in drive shaft 18 retains brake hub 110 in its axial position. The outer periphery of brake hub 110 is formed with a plurality of axially extending splines 114 which receive a plurality of brake friction discs 116. Discs 116 are allowed to move axially along splines 114 but they are prohibited from rotating with respect to splines 114 and thus discs 116 rotate with brake hub 110 and drive shaft 18.

A series of friction brake plate members 118 are interleaved with brake friction discs 116 and are provided with a plurality of circumferentially spaced slots for keyed engagement with a plurality of circumferentially spaced drive lugs 120 that are mounted on a support member 122 disposed within cavity 26 coaxially with respect to drive shaft 18. Friction plate members 118 are allowed to move axially with respect to lugs 120 but they are prohibited from rotating with respect to lugs 120. Support member 122 is splined or keyed to support member 52 and retained in position by a retainer 124. Thus, drive lugs 120 and support member 122 provide a stationary reaction member for brake unit 30. Mounted on the end of hub 110 adjacent support member 122 is an annular radially extending adjustable abutment ring assembly 128 that confronts friction discs 116. Ring assembly 128 provides a unique system for the adjustment of clutch unit 28 and brake unit 30 as is detailed below.

Disposed axially from brake hub 110 is a clutch hub 130 which is also mounted on drive shaft 18 for rotation therewith. The outer periphery of clutch hub 130 is formed with a plurality of axially extending splines 132 which receive a plurality of clutch friction discs 134. Preferably, friction discs 134 are identical to friction discs 116. Discs 134 are allowed to move axially along splines 132 but they are prohibited from rotating with respect to splines 132 and thus discs 134 rotate with clutch hub 130 and drive shaft 18.

A series of friction clutch plate members 136 are interleaved with clutch friction discs 134 and are provided with a plurality of circumferentially spaced slots for keyed engagement with a plurality of circumferentially spaced drive lugs 138 that are formed on an axial extension of end wall member 16. Preferably, friction clutch plate members 136 are identical to friction brake plate members 118. Friction clutch plate members 136 are allowed to move axially with respect to lugs 138 but they are prohibited from rotating with respect to lugs 138. Thus, friction clutch plate members 136 rotate with end wall member 136 and flywheel 22. Mounted on the axially outer end of clutch hub 130 is an annular, radially extending abutment ring 140 which is welded or otherwise secured to clutch hub 130. Abutment ring 140 confronts clutch friction discs 134.

Clutch hub 130 is formed with a plurality of axially extending circumferentially spaced bores 142 which each receive and support a helical coil spring 144. Coil springs 144 operate to place press drive 10 in its normal configuration with brake unit 30 applied and clutch unit 28 disengaged as described below. Clutch hub 130 is also formed with a plurality of axially extending spaced fluid passages 146 which open into a specified number of bores 142. Fluid passages 146 provide for the distribution of cooling and lubricating oil as described below.

Disposed axially between clutch plate member 136 and brake plate members 118 is an annular piston assembly 150. Piston assembly 150 includes a first abutment face 152 engage able with brake friction discs 116 and a second abutment surface 154 engageable with clutch friction discs 134. Piston assembly 150 moves axially along a sleeve 156 which is secured to drive shaft 18. A seal 158 seals the interface between piston assembly 150 and sleeve 156 and a seal 160 seals the interface between drive shaft 18 and sleeve 156. Piston assembly 150 also moves axially with respect to an annular ring 162 which is also secured to drive shaft 18. A seal 164 seals the interface between annular ring 162 and piston assembly 150 and a seal 166 seals the interface between annular ring 162 and drive shaft 18. Annular ring 162 and piston assembly 150 define a sealed fluid chamber 168 which is utilized for operating press drive 10 as described below. Coil springs 144 react against piston assembly 150 to urge piston assembly 150 away from clutch friction discs 134 and toward brake friction discs 116. Thus, coil springs 144 place press drive 10 in its normal position with brake unit 30 applied and clutch unit 28 disengaged.

Piston assembly 150 comprises a brake reaction member 170, a clutch reaction member 172 and a replaceable cylinder sleeve 174. Cylinder sleeve 174 slidably engages both sleeve 156 and annular ring 162. Brake reaction member 170 and clutch reaction member 172 are both mounted on cylinder sleeve 174 using a plurality of bolts 176. Cylinder sleeve 174 is the only member of piston assembly 150 which exhibits sliding motion with respect to sleeve 156 and annular ring 162. Thus, any wear caused by this sliding movement will occur in cylinder sleeve 174. Wear of cylinder sleeve 174 can occur due to contaminants in the pressurized hydraulic fluid which is introduced into chamber 168 and/or contaminants which are present within the cooling and lubricating oil which is supplied to cavity 26 and which therefor bathes piston assembly 150. These contaminants can come from wear of the components of press drive 10 including any wear of discs 116 and 134 and any wear from plate members 118 and 136. By having multiple piece piston assembly 150, only the component experiencing the wear need be replaced thus reducing the costs associated with an overhaul or reconditioning of press drive 10.

Piston assembly 150 moves between clutch unit 28 and brake unit 30 from a normal position where brake unit 30 is applied and clutch unit 28 is disengaged to an actuated position where brake unit 30 is released and clutch unit 28 is engaged. During the movement between these two positions, it is imperative that any overlap between the application of brake unit 30 and the engagement of clutch unit 28 is avoided. If brake unit 30 is partially applied and clutch unit 28 is simultaneously partially engaged, excessive heat and wear of discs 116 and 134 and plate members 118 and 136 will occur. The control of this zone where brake unit 30 is released and clutch unit 28 is disengaged is accomplished by controlling the gap between piston assembly 150, brake unit 30 and clutch unit 28. The present invention utilizes unique adjustable abutment ring assembly 128 to control this gap.

Adjustable abutment ring assembly 128 comprises a stationary ring 180, a movable ring 182 and a plurality of bolts 184. Stationary ring 180 is secured to brake hub 110 by being positioned in a groove 186. Stationary ring 180 includes a plurality of through bores 188 alternated with a plurality of threaded bores 190 circumferentially spaced around ring 180. Movable ring 182 includes a plurality of threaded bores 192 circumferentially spaced around ring 182 in registry with the plurality of through bores 188 in ring 180. Bolts 184 are disposed through bores 188 and threadingly received within bores 192 to produce a pulling bolt system and bolts 184 are threadingly received within bores 190 to produce a pushing bolt system. Thus, in order to control the gap between piston assembly 150, brake unit 30 and clutch unit 28, movable ring 182 is positioned with respect to stationary ring 180 by adjusting the push and pull bolts 184. Due to the minimal wear of brake unit 30 and clutch unit 28, this initial adjustment should keep the gap within acceptable limits for the life of press drive 10. When press drive 10 is torn down for rework and/or refurbishing, the gap can again be set using push-pull bolts 184.

Drive shaft 18 is provided with a plurality of axially and radially extending bores, all of which serve a specific purpose. Bore 82 extends axially down the centerline of drive shaft 18 where it mates with one or more radially extending bores 200. Bores 200 are open to chamber 168. As stated previously, rotary union 80 is threadingly received within bore 82. Pressurized fluid is supplied to chamber 168 through rotary union 80, bore 82 and bores 200 to operate press drive 10 as detailed below. A second axial bore 202 extends through drive shaft 18 to mate with one or more radial bores 204. Bores 204 open at a position radially inward from brake friction discs 116 and brake plate members 118 to provide cooling and lubricating oil for brake unit 30. The oil supplied through bores 204 passes between discs 116 and plate members 118 and into cavity 26. Oil is supplied to bore 202 through an oil inlet 206 extending through oil supply housing 76 and a radial bore 208. The end of axial bore 202 is sealed with a plug 210. A third axial bore 212 extends through drive shaft 18 to mate with one or more radial bores 214. Bores 214 open at a position radially inward from clutch friction disc 134 and clutch plate member 136 to provide cooling and lubricating oil for clutch unit 28. An oil guide ring 216 is positioned between clutch hub 130 to direct oil into fluid passages 146. Ring 216 also includes at least one bore 218 which directs lubricating oil towards bearing 92. The oil supplied through bores 214 flows into passages 146, through a plurality of oil ports 220 extending through clutch hub 130, past clutch friction discs 134 and clutch plate members 136 into cavity 26. The axial end of bore 212 is sealed by a plug 222. Oil is supplied to bore 212 through oil inlet 206 and a radial bore 224. The lubricating oil supplied to cavity 26 from bores 202 and 212 fills cavity 26 and it eventually leaves cavity 26 through a fluid outlet 226 extending through support member 52. The lubricating oil from outlet 226 is cleaned and cooled before being returned to cavity 26 through inlet 206.

The operation of press drive 10 begins with flywheel 22 rotating on bearings 54 and 92 with drive shaft 18 being held stationary by brake unit 30 due to the compression of the pack of brake friction discs 116 and brake plate members 118. This compression locks drive shaft 18 to stationary member 52. When it is desired to power drive shaft 18 by flywheel 22, pressurized hydraulic fluid is provided to sealed chamber 168 through rotary union 80, bore 82 and bores 200. The pressurized hydraulic fluid reacts against piston assembly 150 to overcome the biasing of coil springs 144 and move piston assembly 150 towards clutch unit 28. The movement of piston assembly 150 towards clutch unit 28 first removes the compression between brake friction discs 116 and brake plate members 118 to release brake unit 30 and then it applies compressive loads to clutch friction discs 134 and clutch plate members 136 to engage clutch unit 28. The timing between the release of brake unit 30 and the engagement of clutch unit 28 is controlled by the gap for piston assembly 150 which is built into press drive 10 using adjustable abutment ring assembly 128 as described above. The engagement of clutch unit 28 powers drive shaft 18 by flywheel 22 through discs 134 and plate members 136. Flywheel 22 will power drive shaft 18 as long as pressurized hydraulic fluid is supplied to chamber 168. When pressurized fluid is released from chamber 168, coil springs 144 move piston assembly 150 towards brake unit 30 to disengage clutch unit 28 and apply brake unit 30 as described above. The use of hydraulic fluid or oil for press drive 10 provide the advantage of minimizing the size of chamber 168 when compared with air actuated press drives. The minimizing of the size of chamber 168 also aids in lowering the inertia for press drive 10 as described above.

While the above detailed description describes the preferred embodiment of the present invention, it should be understood that the present invention is susceptible to modification, variation and alteration without deviating from the scope and fair meaning of the subjoined claims.

What is claimed is:

1. An oil shear clutch/brake unit comprising:
   a stationary support member;
   an input member rotatably supported with respect to said stationary member;
   an output member rotatably supported with respect to said stationary support member and said input member;
   a selectively operable brake for prohibiting rotation of said output member with respect to said stationary support member;
   a selectively operable clutch for prohibiting rotation of said output member with respect to said input member;
   a piston disposed between said brake and said clutch, said piston being movable between a first position where said brake is applied and said clutch is disengaged, a second position where said brake is released and said clutch is disengaged and a third position where said brake is released and said clutch is engaged, said second position being defined by a gap between said piston and said brake and said clutch;
   a stationary ring fixably disposed with respect to one of said selectively operable brake and said selectively operable clutch;
   a movable ring disposed between said stationary ring and said one of said selectively operable brake and said selectively operable clutch; and
   an adjustable member attached to said stationary ring, said adjustable member being operable to move said movable ring to set said gap to a specified dimension.

2. The oil shear clutch/brake unit according to claim 1, wherein said stationary ring, said movable ring and said adjustable member are part of said brake.

3. The oil shear clutch/brake unit according to claim 2, wherein said adjustable member comprises a first bolt threading received by said stationary ring, said first bolt operable to move said movable ring away from said stationary ring.

4. The oil shear clutch/brake unit according to claim 3, wherein said adjustable member further comprises a second bolt extending through said stationary ring and threadingly received by said movable ring, said second bolt operable to move said adjustable member towards said stationary ring.

5. The oil shear clutch/brake unit according to claim 2, wherein said adjustable member comprises a bolt extending through said stationary ring and threadingly received by said movable ring, said bolt operable to move said movable ring towards said stationary member.

6. The oil shear clutch/brake unit according to claim 1, wherein said piston comprises a brake reaction member, a clutch reaction member and a replacement cylinder sleeve.

7. The oil shear clutch/brake unit according to claim 6, wherein said brake reaction member engages said brake, said clutch reaction member engages said clutch and said cylinder sleeve is slidingly disposed on said output member.

8. An oil shear clutch/brake unit comprising:
   a stationary support member;
   an input member rotatably supported with respect to said stationary member;
   an output member rotatably supported with respect to said stationary support member and said rotating input member;
   a selectively operative brake for prohibiting rotation of said output member with respect to said stationary support member;
   a selectively operable clutch for prohibiting rotation of said output member with respect to said input member;
   a multiple piece piston disposed between said brake and said clutch, said piston being movable between a first position where said brake is applied and said clutch is disengaged and a second position where said brake is released and said clutch is engaged, said multiple piece piston including:
      a brake reaction member operable to engage said brake;
      a clutch reaction member operable to engage said clutch; and
      a cylinder sleeve slidingly disposed with respect to said output member, said brake reaction member and said clutch reaction member being fixedly secured to said cylindrical sleeve, said brake reaction member abutting said clutch reaction member.

9. The oil shear clutch/brake unit according to claim 8, further comprising an annular ring disposed on said output member, said cylinder sleeve and said annular member defining a fluid chamber.

10. The oil shear clutch/brake unit according to claim 8, further comprising a biasing member urging said multiple piece piston into said first position.

11. The oil shear clutch/brake unit according to claim 10, wherein said biasing member is disposed between said clutch and said multiple piece piston.

12. An oil shear clutch/brake unit comprising:
   a stationary support member;
   an input member rotatably supported with. respect to said stationary member;
   an output member rotatably supported with respect to said stationary support member and said input member;
   a selectively operable brake for prohibiting rotation of said output member with respect to said stationary support member;
   a selectively operable clutch for prohibiting rotation of said output member with respect to said input member;
   a piston disposed between said brake and said clutch, said piston being movable between a first position where said brake is applied and said clutch is disengaged, a second position where said brake is released and said clutch is disengaged and a third position where said brake is released and said clutch is engaged, said second position being defined by a gap between said piston and said brake and said clutch; and
   an adjustable member for setting said gap to a specified dimension, said adjustable member comprising a stationary member secured to said brake, an adjustable member adjustably attached to said stationary member, a first bolt threading received by said stationary member, said first bolt operable to move said adjustable member away from said stationary member, and a second bolt extending through said stationary member and threadingly received by said adjustable member, said second bolt operable to move said adjustable member towards said stationary member.

13. An oil shear clutch/brake unit comprising:
   a stationary support member;
   an input member rotatably supported with respect to said stationary member;
   an output member rotatably supported with respect to said stationary support member and said input member;
   a selectively operable brake for prohibiting rotation of said output member with respect to said stationary support member;

a selectively operable clutch for prohibiting rotation of said output member with respect to said input member;

a piston disposed between said brake and said clutch, said piston being movable between a first position where said brake is applied and said clutch is disengaged, a second position where said brake is released and said clutch is disengaged and a third position where said brake is released and said clutch is engaged, said second position being defined by a gap between said piston and said brake and said clutch; and an adjustable member for setting said gap to a specified dimension, said adjustable member comprising a stationary member secured to said brake, an adjustable member adjustably attached to said stationary member, and a bolt extending through said stationary member and threadingly received by said adjustable member, said bolt operable to move said adjustable member towards said stationary member.

* * * * *